No. 611,108. Patented Sept. 20, 1898.
W. H. DRURY.
MANUFACTURING YARN FROM FIBROUS MATERIALS.
(Application filed Nov. 19, 1897.)
(No Model.) 7 Sheets—Sheet 1.

WITNESSES
INVENTOR
William H. Drury

No. 611,108. Patented Sept. 20, 1898.
W. H. DRURY.
MANUFACTURING YARN FROM FIBROUS MATERIALS.
(Application filed Nov. 19, 1897.)
(No Model.) 7 Sheets—Sheet 2.

Fig. 2.

WITNESSES- INVENTOR-
William H. Drury
by Marcellus Bailey
his Atty.

No. 611,108. Patented Sept. 20, 1898.
W. H. DRURY.
MANUFACTURING YARN FROM FIBROUS MATERIALS.
(Application filed Nov. 19, 1897.)
(No Model.) 7 Sheets—Sheet 5.

WITNESSES
INVENTOR
William H. Drury

No. 611,108. Patented Sept. 20, 1898.
W. H. DRURY.
MANUFACTURING YARN FROM FIBROUS MATERIALS.
(Application filed Nov. 19, 1897.)
(No Model.) 7 Sheets—Sheet 6.

No. 611,108. Patented Sept. 20, 1898.
W. H. DRURY.
MANUFACTURING YARN FROM FIBROUS MATERIALS.
(Application filed Nov. 19, 1897.)
(No Model.) 7 Sheets—Sheet 7.

WITNESSES.
A. D. Grover.
Fred E. Dorr.

INVENTOR.
William H. Drury
by Marcellus Bailey
his Atty.

THE NORRIS PETERS CO., PHOTO-LITHO., WASHINGTON, D. C.

UNITED STATES PATENT OFFICE.

WILLIAM H. DRURY, OF WALTHAM, MASSACHUSETTS.

MANUFACTURING YARN FROM FIBROUS MATERIALS.

SPECIFICATION forming part of Letters Patent No. 611,108, dated September 20, 1898.

Application filed November 19, 1897. Serial No. 659,104. (No model.)

*To all whom it may concern:*

Be it known that I, WILLIAM H. DRURY, a citizen of the United States, residing at Waltham, in the county of Middlesex and State of Massachusetts, have invented certain new and useful Improvements in Manufacturing Yarn from Fibrous Materials, of which the following is a specification, reference being had to the accompanying drawings.

My invention relates to making twisted and completed yarn from fibrous materials in one continuous operation or series of operations; and it consists, first, in a new system or art of spinning or making yarn from fibrous materials, which system or art consists in passing the material through a carding process and thence continuously in numerous sections through a spinning process, rolling up said sections of material severally into fibrous rolls and revolving said fibrous rolls, drawing said rotating fibrous rolls severally as they form lengthwise of themselves into strands of yarn, and condensing the said strands of material severally while being so drawn; second, in a new spinning or yarn-making machine to receive carded fibrous material in numerous sections or subdivisions, to roll up the said sections or subdivisions of material severally into fibrous rolls and revolve the same, to draw said rotating fibrous rolls severally as they form lengthwise of themselves into strands of yarn, and to condense the said strands of material severally while being so drawn; third, in the combination, with a carding-machine for carding fibrous materials, of a spinning-machine to receive the material from the carding-machine in numerous sections or subdivisions, to roll up the said sections or subdivisions of material severally into fibrous rolls and revolve said fibrous rolls, to draw said rotating fibrous rolls severally as they form lengthwise of themselves into strands of yarn, and to condense said strands of material severally while being so drawn, and, fourth, in improvements in machinery for spinning or making yarn whereby a web, sheet, width, or quantity of carded fibrous material is transformed directly and continuously into many or numerous strands of twisted and completed yarn, such invention being useful for making yarn from all kinds of fibrous materials, including not only those ordinarily used for making yarn, but also those which by ordinary yarn-making systems and machinery cannot be nearly so well utilized for that purpose—such as cattle-hair, wool-waste, cotton-waste, flax-waste, jute-waste, ramie-waste, silk-noils, fibrous peat, asbestos, and many other slippery, short, stiff, weak, or cheap fibers—every fiber whatsoever that can be carded being suitable for making yarn successfully and economically by my invention.

In conducting a common and well-known system of making yarn two or more ring-doffers are used upon a finisher carding-machine in such manner that the doffer-rings of such doffers serve to subdivide the fibrous material from the surface of the main cylinder of the machine lengthwise of the direction of the carding into many or numerous narrow sections or strips. In succeeding stages of that system devices are employed which serve continuously to take from said doffer-rings the said fibrous sections and to rub and condense them and draw them away forward of the rings and wind them upon a spool in the form of numerous strands of untwisted roving. In the final stage of that system the spool of roving is put upon a mule, on which the several strands from the spool are drawn, spun, and twisted into as many strands of completed yarn; but by my invention the material of each of the fibrous sections, instead of being drawn off forward of its ring in an untwisted strand, is rolled up into a fibrous roll lying crosswise of the length of the section and drawn sidewise of its ring, being at the same time twisted from behind and compressed and stretched and wound in the form of a strand of twisted and completed yarn ready for use.

One of the objects of my invention is to simplify in a practical way the making and spinning of yarn, to shorten the way of making and spinning it, to dispense with a mule or the like, and, instead of taking from the carding-machine numerous strands of untwisted roving to be subsequently made into completed yarn with much additional labor and machinery, to transform the material from the carding-machine directly into many or numerous strands of twisted and completed yarn ready for use, and thus to make much saving in room, machinery, power, and labor.

This object is accomplished by my invention, since a machine operating in accordance therewith, although of trivial cost and occupying not more than a foot in depth of space across the delivery end of a carding-machine, saves the cost of a mule, the wages of a man to operate a mule, the power required to run a mule, and the vast room occupied by a mule, and, in short, as compared with any other known system of spinning, eliminates entirely the cost of spinning and saves considerable in the cost of carding.

In a carding and yarn-making machine conducting a process different from the common system aforesaid there has been embodied the combination, with its doffer and comb, of mechanism to coöperate with the doffer and comb to collect and compress the combed-off material into a fibrous roll lying parallel to the axis of the doffer and to revolve said fibrous roll to produce the desired twist in the yarn, and mechanism whereby the rotating fibrous roll as it forms is continuously drawn lengthwise into yarn. This is shown in the United States reissued patent of Nicolas Cupers, No. 11,524, dated February 25, 1896; but by such machine no more than two strands of twisted and completed yarn at a time can be produced, and even those few must be drawn in opposite directions from each other, so that one has a right-hand and the other a left-hand twist. Hence its production is so small and of such quality that it is not commercially practical to make therewith anything but very coarse-sized yarns, for which the demand is comparatively trivial. Although such machine can make good yarn from fibers which cannot well be used for making yarn by any ordinary method or machinery, the limitations above mentioned so restrict its usefulness that it has not come and is not likely to come into considerable use; but by my invention may be made from a web, sheet, or width of carded fibrous material as many strands of twisted and completed yarn at a time as are ordinarily made of untwisted roving by the common and well-known system aforesaid, and each strand may be of as light weight as a strand of untwisted roving ordinarily produced by said well-known system, so that my invention is useful and economical for the manufacture of small or medium sized yarn, for which the demand is far beyond that for coarser yarns, and by my invention all the strands that can be produced at a time may be uniform with each other in their twist, so that the usefulness of the yarn for making even-faced and well-finished fabrics therefrom may be unimpaired, it being well known that such fabrics cannot be made when yarns of different twists are mixed together in the same piece. By the use of my invention it is practical to make as many as sixty-four strands, or even more, of twisted and completed yarn at a time, of uniform twist, directly from a forty-eight-inch card.

Another of the objects of my invention is to provide a spinning or yarn-making machine which may be set at the delivery end of a carding-machine and receive the material therefrom and transform it directly into many or numerous strands of twisted and completed yarn, a spinning or yarn-making machine which may be self-contained, may be dealt in as an article of manufacture by itself, may be made of various sizes, so as to operate upon or with various-sized carding-machines, and may when completed be ready to transport without taking it apart and be ready on arrival at its destination to operate upon or with any carding-machine of corresponding width, whether old or new and whether made by one maker or by another, so that while revolutionizing any existing system of making and spinning yarn in a mill its adoption in such mill need not involve great or undesirable waste of existing equipment.

By my invention the fibrous web, sheet, or width produced by carding is subdivided lengthwise into many or numerous narrow fibrous strips, sections, or parts. The material of each strip is rolled up and wrapped in thin films or layers, one upon the other, to form a fibrous roll lying crosswise of the strip. Each of said rolls is revolved and whirled to compact and reduce it and to twist from its hind end the yarn made therefrom and is drawn lengthwise of itself and further compressed, evened, and condensed while being so drawn, and the material of the whole web, sheet, or width is transformed directly and continuously into many or numerous strands of twisted and completed yarn. This result I attain by a mechanism which comprises, essentially, means for carding the material, in combination with means for subdividing the carded material definitely and on predetermined lines into numerous narrow, separate, and independent sections, together with means for simultaneously side-drawing said several sections and spinning the same into yarn. I believe myself to be the first to have done this.

In the drawings are represented a spinning and yarn-making machine and certain improvements in machinery for performing the various operations by which a web, sheet, or width of carded fibrous material is transformed directly and continuously into many or numerous strands of twisted and completed yarn in accordance with my invention.

1ª is a detail view showing the slot of the devices on the ends of the traversing or sliding rods which carry the traversing fingers of the winding mechanism. Figs. 4 to 10, inclusive, are drawn on a larger scale than the others.

In the drawings my improved spinning or yarn-making machine is shown as including the two series of doffer-rings C, the corresponding series of twisting and wipe rolls D, the corresponding series of side-drawing rolls $a$ and $b$, driven by the shafts $c$ by means of the bevel-gears $d$, meshing into the bevel-gears $e$, the condensing straps or devices $f$, driven by the shafts $g$ by means of the pulleys $h$ thereon, over which the straps pass, the winding mechanism shown for winding the yarn produced by the machine, and the side frame A' and girders E, which support the several elements aforesaid; but the doffer-rings C, instead of being a part of my improved machine, may, if preferred, form a part of the carding-machine proper, in which case their supporting-arms F, instead of being cast with or bolted to the framework A' of my machine, may be cast with or bolted to the framework A of the carding-machine proper in the same way as usual when ring-doffers are used on a finisher carding-machine. Moreover, the winding mechanism, instead of being supported by the framework of my machine, may be supported in any other suitable manner.

Figure 1:
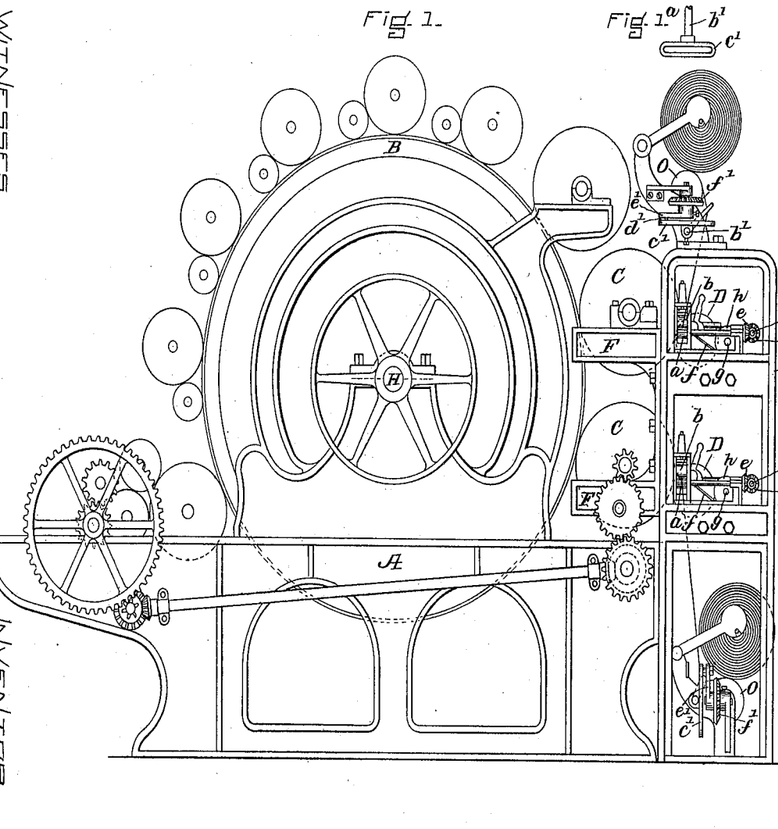
Figures 1 and 2 are views of the right-hand side and left-hand side, respectively, of my machine and improvements as set at the delivery end of a carding-machine in position to operate upon or with such carding-machine and to make or spin numerous strands of yarn at a time from fibrous material continuously in the progress of the carding of such material by such carding-machine. Fig.
Figure 2:
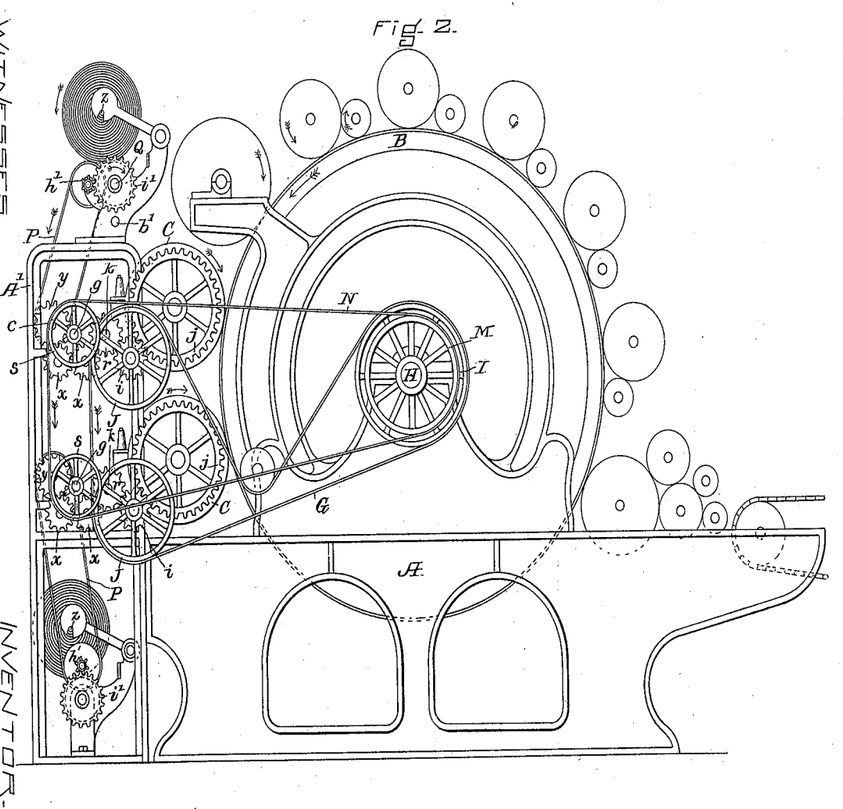
Figure 3:
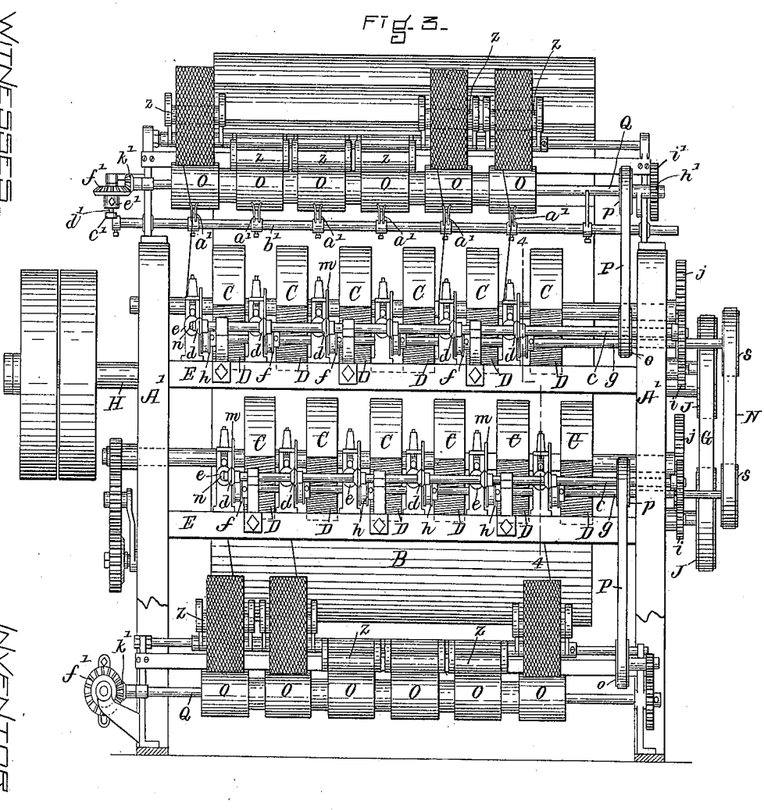
Fig. 3 is an end view of my machine, looking toward the end at which the strands of completed yarn are delivered.
Figure 9:
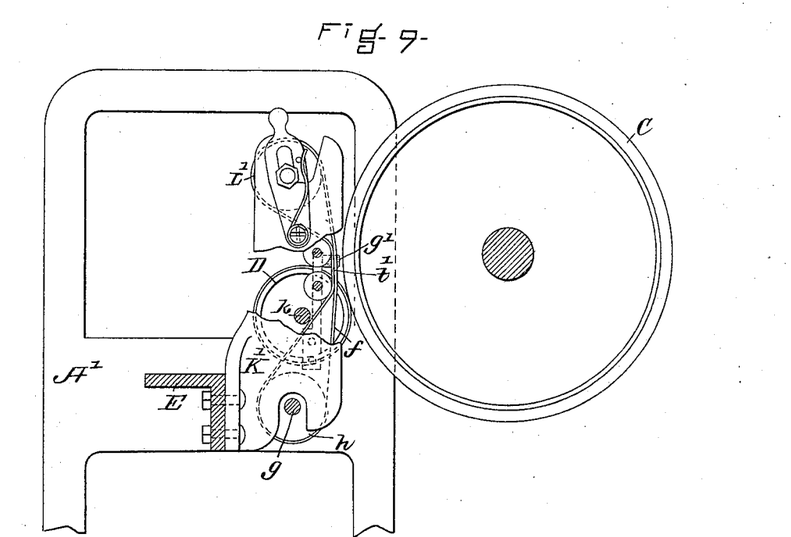
Fig. 9 is a side view, and Fig. 10 a front view, illustrating another modification.
Figure 10:
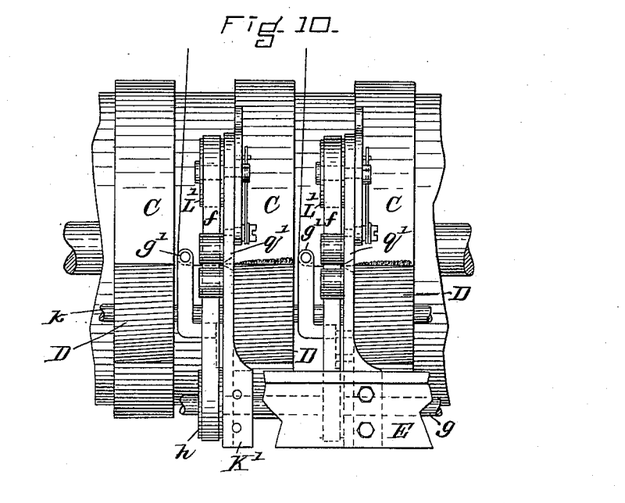

The two series of doffer-rings C have the same arrangement and function in relation to the main cylinder B of the carding-machine and to each other as doffer-rings usually have when used on a finisher-card, the rings of the one ring-doffer being set opposite the intervals between the rings of the other ring-doffer, as shown in Fig. 3; but the doffer-rings shown in Figs. 1 to 8, inclusive, differ from the common kind in being open down to the doffer-shafts, so as to admit of placing side-condensing and side-drawing devices and their supports on one side of each ring. The common kind of ring-doffers may be used, however, as illustrated in Figs. 9 and 10, and probably this common kind will be the favorite style of ring-doffers to use with or on my machine. Said doffers are actuated from the main-cylinder shaft H by a belt passing over the pulley I thereon, and thence over the pulleys J, which run on shafts supported by the framework of my said machine, said pulleys J being concentric with and made fast to the gears $i$, which mesh into the gears $j$ on the ends of the doffer-shafts.

As may be inferred from what has already been expressed, the framework A' and girder E of my said machine support the twisting-roll shafts $k$, the strap-driving shafts $g$, and the shafts $c$, which, through suitable gearing, operate the shafts $n$ of the drawing-rolls $a$ and $b$. The same girder also supports the stands K, which hold up the studs on which the loose pulleys L run, the studs on which the loose pulleys $l$ run, the fulcrums $w$ of the levers $m$, the bearings of the shafts $n$ of the side-drawing rolls $a$ $b$, and the protecting-plates $q$. The twisting-roll shafts $k$ are actuated by the gears $i$, which mesh into the gears $r$ on the ends of the twisting-roll shafts and revolve the latter in the same direction as said doffers. Each of said twisting-roll shafts has a series of twisting-rolls D attached to it, such in number, arrangement, position, and length that each of said doffer-rings is accompanied by its own separate individual twisting-roll. The "twisting-rolls" are here called by that name because they and the doffer-rings help each other to revolve and whirl or spin between them the fibrous rolls hereinbefore referred to, and thus to impart twist to the strands of yarn produced therefrom. In the best form of my invention the said twisting-rolls are also wipe-rolls—that is to say, they are covered with corduroy, or card-clothing or emery, or some other suitable material, so as to act as wipe-rolls to clear their accompanying doffer-rings of their fibrous material. When the doffer-rings and the wipe-rolls are in proper relation to each other in speed and position and are in action, the wipe-rolls clear the doffer-rings, and the doffer-rings in turn clear the wipe-rolls, and each doffer-ring and its accompanying wipe-roll combined then act upon the fibrous material in such manner that they coöperate to form between them a fibrous roll of the material and to revolve such fibrous roll between them with great rapidity. The wipe-roll is an element of great importance in my invention in its best form, because it wholly dispenses with the use of a comb on most classes of fibrous material.

When covered with card-clothing, the twisting-roll is three rolls combined in one—that is to say, it is a twisting-roll, a wipe-roll, and a scavenger roll or dicky, all combined in one roll, keeping its accompanying doffer-ring clean and sharp, besides coöperating therewith, as aforesaid, and when thus covered it acts in each of its several capacities better with most fibrous materials than when it is bare or than when it is covered with corduroy.

Each doffer-ring and its accompanying twisting and wipe roll compose a set of devices, the office of which is as follows: The doffer-ring receives from the main cylinder of the carding-machine a narrow section, strip, or part of the fibrous web, sheet, or width which lies thereon in the ordinary operation of carding, and the devices of said set (of which said doffer-ring forms part) coöperate to roll up the material of such fibrous strip, section, or part into a fibrous roll lying crosswise of the length of the strip and to rapidly revolve or whirl such fibrous roll about its axis and at the same time to compress and compact the fibers of the fibrous roll together, as if it were rolled between human hands. The devices of said sets must be carefully adjusted in such relation to each other in speed and position as to coöperate as aforesaid, which, although it requires skill and practice, a person of ordinary skill in the art can readily do after a little practice and on understanding the effects desired to be accomplished by said devices. If the doffer-rings used are twelve inches in diameter, (a good size to use,) I recommend that they be made to run from thirty-six to forty-eight revolutions per minute after the machine gets settled to its regular work. The surface speed of the twisting and wipe rolls should be as fast as that of the doffer-rings or a little faster. Their speed may be varied to suit by a change of gears on the ends of their shafts. The twisting and wipe roll should almost touch the doffer-ring which it accompanies.

Figure 7:
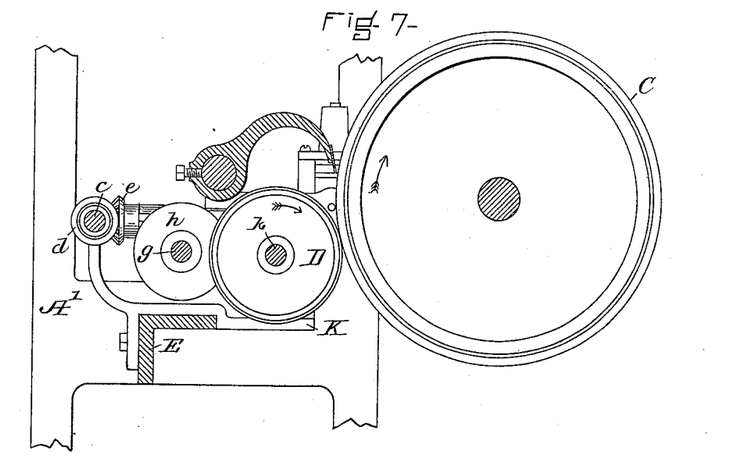
Fig. 7 shows a comb in connection with one of the spinning devices.

Fig. 7 illustrates a modified form of the mechanism for coöperating with the doffer-ring to collect and roll up the material from the latter into a fibrous roll and to revolve or whirl the fibrous roll. In this modified form each series of doffer-rings, besides being accompanied by a corresponding series of twisting-rolls, is accompanied also by a corresponding series of vibrating combs to clear the doffer-rings. The combination with each doffer-ring of a doffing-comb and twisting-roll does effective work with all kinds of carded fibrous materials, and the comb is an aid when there is occasion to start a new strand of yarn from a fibrous roll through the condensing and drawing mechanism. If combs are used at all, they should vibrate with great rapidity, or else the speed of the doffer-rings and twisting-rolls should be less than above advised. With such rings and rolls having the speed herein advised I should prefer combs making eighteen hundred vibrations per minute to slower ones. If combs are used, each doffer-ring and its accompanying comb and twisting-roll should be adjusted in such relation to each other that the ring and twisting-roll shall almost touch each other and that the comb shall keep the fibrous roll well down between the ring and twisting-roll, so that they will rapidly revolve it, roll it, and compress it, for it is right here more than anywhere else that the yarn is made and twisted. However, for ordinary work I prefer to discard the combs altogether.

Figure 4:
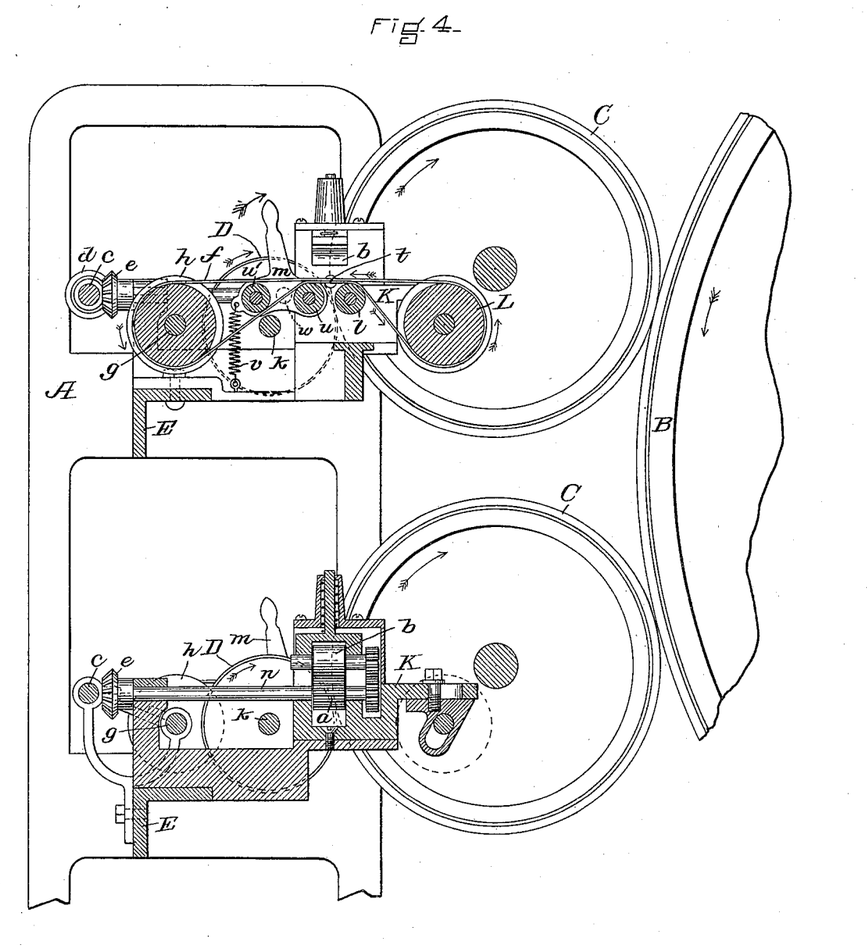
Fig. 4 is a vertical section of certain parts, taken on the line 4 4 in Fig. 3.

Accompanying each of said sets of devices is a separate condensing device, which consists of a narrow endless strap $f$, with two of its surfaces normally touching each other on the extended axial line of the fibrous roll to be operated upon by the one of said sets of devices which such condensing-strap accompanies. Said two normally-touching surfaces are to run in opposite directions from each other across and transversely to said axial line. The strap-driving shafts $g$ are driven from the main-cylinder shaft H in the opposite direction from said doffers by a belt N, passing over the pulley M thereon and thence over the pulleys $s$ on the ends of the strap-driving shafts. The straps are directly driven by the pulleys $h$ on said shafts $g$. Fig. 4 shows the arrangement and mode of operation of each of the straps which pass over the pulleys $h$ and the loose pulleys L, running alongside the doffer-rings on studs held by stands K, as above mentioned. The inner surfaces of each strap are brought and kept together at $t$, so as to normally touch each other at that point, by means of the small loose pulleys $l$ and $u$. The pulley $l$ is journaled in the stand K. The loose pulley $u$ is supported on a stud in one end of a vibratory lever $m$, fulcrumed in the stand K at $w$, and having at its other end a similar loose pulley $u'$, which is located between the two parts of the strap and is designed when required to bear against and lift the upper part of the strap. The loose pulley $u$ and the pulley $l$ are beneath the under part of the strap and are designed to press the two faces of the strap together when the parts are in normal position, as shown in Fig. 4. The lever $m$ is held in this position by the spring $v$. When, however, the lever $m$ by its handle is pushed or tilted from its normal position in the direction indicated by the arrow in Fig. 4, the pulley $u'$ will lift the upper part of the strap, while the pulley $u$ will drop, so as to allow the under part of the strap to correspondingly drop, thus permitting the meeting faces of the strap to spread apart and making it easy to start the fibrous roll between the normally-touching surfaces of the strap. Between said normally-touching surfaces and in said axial line the material from the fibrous roll continuously passes on its way to a drawing mechanism of the machine. Good results are obtained by running said straps at about the same speed as the surface speed of the doffer-rings, and this should be their usual speed, because generally it would be injurious to the working of my system to allow them to run either much faster or much slower; but their speed should be adjustable, so as to be varied when desired, which may be done by substituting larger or smaller pulleys in place of the pulleys $s$ on the ends of the shafts which drive said straps. On each side of said strap in the protecting-plate $q$ and in the support of the stud on which the loose pulley $l$ runs and with its center about in said axial line is an eye $q^2$, Fig. 6, through which the fibrous material passes. These eyes guide the material and keep it from departing from said axial line while being acted upon by said strap. The office of said strap is to assist the doffer-ring and its accompanying twisting-roll in revolving the fibrous roll or to prevent it from lagging behind the speed of revolution at which the doffer-ring and twisting-roll tend to whirl it; also, to prevent the strand from untwisting before it passes the drawing mechanism and to compress, even, and condense the material which passes between said normally-touching surfaces on its way from the body of a fibrous roll to a drawing mechanism. The action of the strap, also, upon the fibrous roll is like rolling it between human hands. Besides revolving that part of the fibrous roll which it touches, being more positive than the doffer-ring and twisting-roll in its action upon the fibrous roll, it even helps to revolve that part of the latter which is between the doffer-ring and twisting-roll and in that way, but in no other, helps in twisting the yarn.

In the continuous operation of said machine the straps and said sets of devices which they accompany act together upon the fibrous rolls, respectively, to keep them revolving and twisting while the strands of yarn into which the fibrous rolls are converted are being drawn away. It is by the revolution of each fibrous roll between the doffer-ring and its accompanying twisting-roll that the yarn produced from the fibrous roll receives its positive and genuine twist from its hind or loose end, which is contained in the fibrous roll. However fast the condensing device runs the yarn is not genuinely twisted any more rapidly than the fibrous roll revolves before coming between said normally-touching surfaces of the strap.

The use of the protecting-plate $q$, besides its use for the eye above mentioned, is to protect the condensing mechanism from the gathering of fibrous material therein.

As shown in the drawings, Figs. 1 to 6, each of said sets of devices is also accompanied by drawing mechanism, which consists of a pair of nipping and drawing rolls coupled together and located in position to draw the materal from the fibrous roll between said normally-touching surfaces of the strap, and they constantly nip and hold the twist of the completed yarn as it is drawn by them between and from said normally-touching surfaces. The drawings show separate drawing mechanism for each strand of yarn produced by the machine; but if drawing mechanism common for all the strands or for some of them should be used it would not be a departure from my invention.

Figure 5:
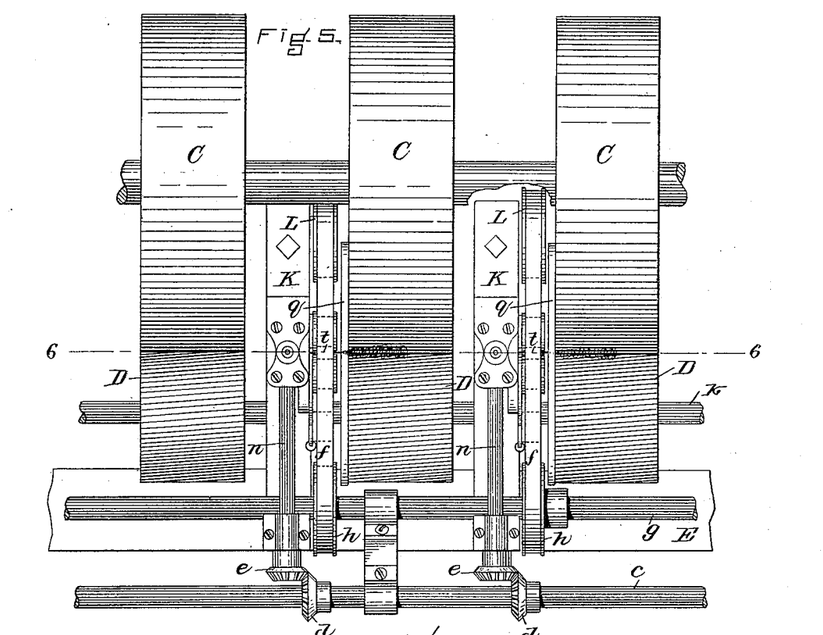
Fig. 5 is a plan of two of the spinning devices.
Figure 6:
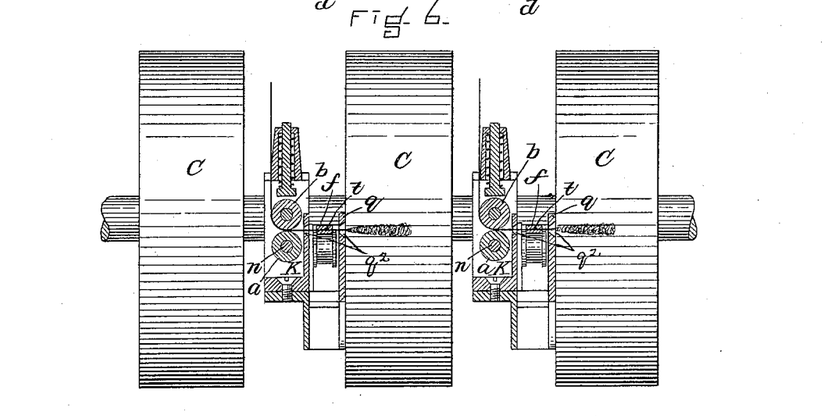
Fig. 6 is a vertical section on line 6 6 in Fig. 5.

Figs. 4, 5, and 6 of the drawings show the construction of the drawing mechanisms and how they operate. The shafts $c$ are driven in the opposite direction from said doffers by the gears $k$ through intermediate gearing $x\,x$, finally meshing into the gears $y$ on said shafts $c$. The drawing mechanisms are driven by these shafts $c$ by means of the bevel-gears $d$ thereon meshing into the bevel-gears $e$ on the drawing-roll shafts $n$, to each of which is fixed the lower roll $a$ of one of these several pairs of drawing-rolls. The upper and lower drawing-rolls of each pair are kept together by springs and are geared together like common drawing-rolls. The several pairs of drawing-rolls are so located and operated as to draw the strands of yarn coming from either of the series of doffer-rings in the same direction with each other, so that said strands will all be alike in twist. The speed of each drawing mechanism should be carefully adjusted to draw the material as rapidly as can be done practically without breaking the material in order that the full capacity of the machine in weight of production of any particular yarn within a given time may be utilized. This varies with the quality, length, and strength of fiber and with the size of yarn produced. Hence the speed of each drawing mechanism should be readily adjustable to suit such varying conditions. It should also be thus adjustable without affecting the speed of the doffers, because in many cases it will be desirable to increase the speed of the drawing mechanism while lessening or not changing that of the doffers, or vice versa. In the machine illustrated it is easy to change the speed of all the drawing mechanisms at once by simply substituting gears of more or fewer teeth in place of the gears $y$ on the ends of the shafts $c$, which drive the drawing mechanism. The speed of the drawing mechanism should depend materially upon the surface speed of the doffer-rings and twisting-rolls. The yarn makes faster, and hence can be drawn away faster, when the rings and twisting-rolls go fast than when they go slow. In the ordinary work the ratio of the speed of drawing away a strand of yarn will be to the surface speed of the rings probably not more than as one to two, and the ratio of one to three or somewhere between that ratio and the one first mentioned will ordinarily be found better, because it gives the yarn time to make, which must always be done. A strand of coarse yarn can be made and drawn off faster per yard than one of fine yarn.

The size of yarn made when the doffer-rings are of a given width should be regulated mainly at the feed end of the carding-machine by feeding in faster when coarser yarn is wanted and slower when finer is wanted.

By the said arrangement of doffer-rings, by said sets of devices, and by said condensing and drawing mechanisms the web, sheet, or width of fibrous material which in the ordinary operation of carding lies upon the main cylinder of the carding-machine represented in the drawings is continuously subdivided into twelve narrow strips of equal width, which are transferred separately and simultaneously to the surfaces of the doffer-rings, respectively. Then between said rings and twisting-rolls the said fibrous strips of material are separately and progressively rolled up, and at the same time all the fibrous rolls thus formed are revolved rapidly about their axes and the fibers thereof compacted together, and then said fibrous rolls, while revolving, are separately and simultaneously drawn lengthwise continuously between said normally-touching surfaces of said straps, and while being so drawn are further compressed, evened, and condensed to form the desired strands of yarn. The several strands after passing through the nipping and drawing rolls are wound upon the spindles $z$, the surfaces of which bear upon the outside of the revolving drums O, the frictional action of which against the spindles or the material thereon causes the spindles to revolve, or the winding may be done by any other suitable means. As shown in the drawings, said drums may be conveniently revolved by action of the shafts $c$, which drive the drawing mechanisms, by means of belts P, passing over the pulleys $o$ on said shafts and the pulleys $p$, which drive the gears $h'$, meshing into the gears $i'$ on the ends of the shafts Q of said drum. The yarn is distributed across the spindles by traversing fingers $a'$, attached to the lengthwise-sliding rods $b'$. On the end of each sliding rod is a device $c'$, (see Fig. 1$^a$,) in which there is a slot at right angles to this rod, and into this slot is inserted a pin $d'$ on the end of the arm $e'$, which is fixed to a vertical shaft of the bevel-gear $f'$, which is driven by the bevel-gear $k'$ on the end of the drum-shaft. When the drum-shaft Q revolves, it causes the pin on the end of said arm to sweep around in a circle and to slide to and fro in said slot and slide the rod with its traveling fingers.

Figure 8:
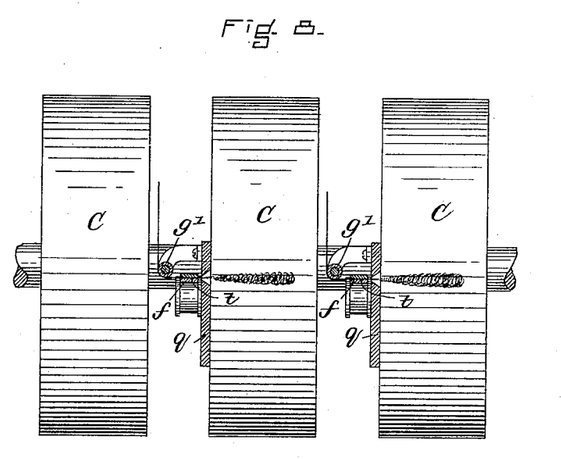
Fig. 8 illustrates a modification.

The nipping or drawing rolls shown in the drawings may be wholly dispensed with without departing from my invention, and the drawing away of the strands of yarn may be done wholly by the winding mechanism, in which case each strand of yarn as it comes from one of the condensing devices is made to turn around a loose pulley $g'$ or other equivalent device, as shown in Fig. 8, and thence goes direct to the winding mechanism. (Illustrated in Figs. 1 to 3.)

The drawings show six doffer-rings of equal width in each series thereof and represent a machine adapted for subdividing a carded fibrous web, sheet, or width into twelve narrow strips or sections of equal width and producing twelve strands of yarn at a time. If the main cylinder of said machine be supposed to be forty-eight inches wide, the dofferrings of either series would be four inches wide or thereabout, and any two of them adjacent to each other in the same series would be four inches apart, or thereabout. The open space between two adjacent rings in either series is for condensing and drawing mechanisms and their supports. Such open space is not necessary, however, and it is practical, as before stated, to use ordinary ring-doffers which do not have such open space. All that is necessary is to change the position of the condensing-straps, discard the numerous pairs of nipping-rolls, and draw out each strand of yarn around a loose pulley $g'$, and thence to the winding mechanism, all as shown in Figs. 9 and 10; but the distance between two adjacent rings need not be four inches. It may be less. For example, it may be reduced to two inches, in which case there could be twenty-four doffer-rings each two inches wide in two series of twelve each, or there could be forty-eight doffer-rings each one inch wide in three series of sixteen each. The former would be suitable for making twenty-four strands and the latter for making forty-eight strands of yarn at a time.

The arrangement illustrated in Figs. 9 and 10, just referred to, of the condensing-straps in or opposite to the intervals between the doffer-rings, with the meeting faces in a plane tangential, or approximately so, to their respective doffer-rings, is not here specifically claimed, but forms in part the subject of my application filed July 22, 1898, Serial No. 686,600, on which Letters Patent will issue of even date herewith.

I do not confine myself to the use of two series of doffer-rings, since it is evident that a larger number may be used, if desired. For example, three series may be used with three corresponding series of twisting and wipe rolls and condensing mechanisms. It is common to use three series of doffer-rings upon a finisher-card in operating the common and well-known system of making yarn hereinbefore referred to. If three series were used on my machine, they would have the same arrangement and function in relation to the main cylinder and to each other as doffer-rings usually have when three series are used on a finisher-card. Thus a machine with main cylinder forty-eight inches wide may have twenty-four two-inch doffer-rings in two series of twelve each or forty-eight one-inch doffer-rings in three series of sixteen each. In either case any two adjacent doffer-rings in either series would be two inches apart or thereabout, giving ample room for the necessary mechanism between rings. In the one case the machine would be adapted for producing twenty-four strands and in the other for producing forty-eight strands of yarn at a time from a sheet of carded fibrous material.

I do not confine myself to the use of straps for condensing devices, for tubes or trumpets revolving in the opposite direction from the doffer-rings, as shown, for example, in Cuper's reissued Patent No. 11,524, of February 25, 1896, may be used instead of the straps with the same sort of effect, but with far less degree of effect, as compared with the straps. I have used both the tubes and the straps and prefer the latter for many reasons. One reason is that the ordinary ring-doffer in universal use may be used with the straps. Another reason is that the straps accommodate themselves to all circumstances automatically and require no change when changing from one size of yarn to another; but if tubes should be preferred they should be like pulleys in external shape, their central openings should be in line with the fibrous rolls being drawn, they should run in bearings supported between the open doffer-rings, and should be revolved by bands passing around the pulleys $h$ and around the tubes, or they may be driven and supported by any other suitable means.

By the machine illustrated all the strands are drawn out from the fibrous roll in the same direction with each other. I much prefer this, because it makes all the strands uniform with each other in twist. For reasons well-known to weavers and finishers of cloth this is desirable; but, if desired, the strands drawn from the fibrous rolls in one horizontal line may be drawn toward the right, and those drawn therefrom in another horizontal line may be drawn toward the left by placing the condensing mechanisms to the right of the fibrous rolls in one horizontal line and to the left of the fibrous rolls in another horizontal line. The strands of yarn drawn toward the right would have opposite twist from those drawn toward the left.

A machine spinning and making forty-eight strands of yarn at a time from a forty-eight-inch card is better than one making twenty-four strands for production of yarn of No. 1 run (sixteen hundred yards per pound) or thereabout, but for sizes coarser than No. ¼ run (four hundred yards per pound) the machine making twenty-four strands at a time would be better.

My said machine is portable. Several of the machines may be used upon or with the same carding-machine, one at one time and another at another time, so that a manufacturer of yarn on my system may always have at hand the means best adapted for the production of various sizes of yarn upon or with the same carding-machine. For example, one of my said machines adapted to operate with a forty-eight-inch card may be provided with twelve four-inch doffer-rings, as illustrated in the drawings, another with sixteen three-inch rings, another with twenty-four two-inch rings, another with thirty-two one-and-one-half-inch rings, another with forty-eight one-inch rings, and another with sixty-four three-fourth-inch rings, and either of these may be used with the same forty-eight-inch card at one time and either of the others at another time. Herein consists one of the great advantages of my invention, since the cost of making one of my machines would be trivial as compared with that of making a carding-machine, and it would be a simple matter to set away one of my machines after using it and to substitute another temporarily in its place.

I claim as my invention—

1. In machinery for making yarn from fibrous materials, the combination with means for carding or straightening the fibers of means to continuously subdivide the carding material definitely and on predetermined lines into numerous narrow and independent sections and to continuously form or roll up said sections severally into fibrous rolls and revolve said rolls; and mechanism to continuously draw said rotating fibrous rolls severally, as they form, lengthwise of themselves into strands of yarn, substantially as and for the purposes hereinbefore set forth.

2. In machinery for making yarn from fibrous materials, the combination with means for carding or straightening the fibers, of mechanism to continuously subdivide the carded material definitely and on predetermined lines into numerous narrow sections, and to continuously form or roll up said sections severally into fibrous rolls and revolve said rolls; mechanism to continuously draw said rotating fibrous rolls severally, as they form, lengthwise of themselves, into strands of yarn; and mechanism to compress or condense said strands while being so drawn, substantially as and for the purposes hereinbefore set forth.

3. In a machine for spinning or making yarn from fibrous materials, the combination with mechanism for continuously subdividing a web, sheet or width of carded fibrous material lengthwise into many or numerous narrow and separate sections or strips, of mechanism for continuously forming or rolling up said sections or strips of material severally into fibrous rolls and revolving said rolls; mechanism whereby said rotating fibrous rolls, as they form, are severally and continuously drawn lengthwise of themselves into strands or yarn; condensing-straps between whose meeting surfaces said strands of material pass while being so drawn; and means for operating said straps to rub said strands of material in the same direction as that in which they are being revolved, substantially as hereinbefore set forth.

4. In a machine for spinning or making yarn from fibrous materials, the combination with a plural number of series of rings, having their surfaces arranged in relation to each other like ordinary doffer-rings of the same number of series, for receiving fibrous material in numerous narrow sections or subdivisions, of mechanism to coöperate with such rings to collect therefrom and form or roll up said sections or subdivisions of material severally into fibrous rolls and revolve said rolls; mechanism whereby said rotating fibrous rolls, as they form, are severally and continuously drawn lengthwise of themselves into strands of yarn; means whereby said strands of material are compressed or condensed while being so drawn; and means for operating said rings, substantially as hereinbefore set forth.

5. In a machine for spinning or making yarn from fibrous materials, the combination with a plural number of series of doffer-rings for receiving fibrous material in numerous narrow sections or subdivisions, of corresponding twisting and wipe rolls to accompany said rings respectively and to coöperate therewith to collect therefrom and form or roll up said sections or subdivisions of material severally into fibrous rolls and revolve said fibrous rolls; mechanism whereby said rotating fibrous rolls, as they form, are severally and continuously drawn lengthwise of themselves into strands of yarn; means whereby said strands of material are compressed or condensed while being so drawn; and means for operating said rings and said twisting and wipe rolls, substantially as hereinbefore set forth.

6. In a machine for spinning or making yarn from fibrous materials, the combination with a plural number of series of doffer-rings for receiving fibrous material in numerous narrow and separate sections or subdivisions, of corresponding individual doffing-combs; mechanism to coöperate with such rings and combs to collect from said rings and form or roll up said sections or subdivisions of material severally into fibrous rolls and revolve said rolls; mechanism whereby said rotating fibrous rolls, as they form, are severally and continuously drawn lengthwise of themselves into strands of yarn; means whereby said strands of material are severally compressed or condensed while being so drawn; and means for operating said rings and combs, substantially as hereinbefore set forth.

7. In the herein-described machine for spinning or making yarn from fibrous materials, the combination of the doffer-rings for receiving the material in many or numerous narrow and separate sections or subdivisions; the twisting and wipe rolls for coöperating with said doffer-rings respectively to collect therefrom and roll up and compress the said sections or subdivisions of material severally into fibrous rolls and revolve said fibrous rolls; the side-drawing mechanism for drawing said rotating fibrous rolls severally, as they form, lengthwise of themselves into strands of yarn; the condensing mechanism for compressing or condensing said strands of material severally while being so drawn; and the means for operating said rings, said twisting and wipe rolls and said mechanisms, substantially as hereinbefore set forth.

8. In the herein-described machine for spinning or making yarn from fibrous materials, the combination of the doffer-rings for receiving the material in many or numerous narrow and separate sections or subdivisions; the individual doffing-combs for accompanying said rings and vibrating up and down across the surfaces thereof respectively; the twisting-rolls for coöperating with said rings and combs respectively to collect from said rings and roll up and compress said sections or subdivisions of material severally into fibrous rolls and revolve said fibrous rolls; the side-drawing mechanism for drawing said rotating fibrous rolls severally, as they form, lengthwise of themselves into strands of yarn; the condensing mechanism for compressing or condensing said strands of material while being so drawn; and the means for operating said rings, combs, twisting-rolls, and mechanisms, substantially as hereinbefore set forth.

9. In the herein-described machine for spinning or making yarn from fibrous materials, the combination of the doffer-rings for receiving the material in many or numerous narrow and separate sections or subdivisions; the twisting and wipe rolls for coöperating with said rings respectively to collect therefrom and roll up and compress the said sections or subdivisions of material severally into fibrous rolls and revolve said fibrous rolls; the winding mechanism for drawing said rotating fibrous rolls severally, as they form, lengthwise of themselves into strands of yarn and winding said yarn; the condensing mechanism for compressing or condensing said strands of material severally while being so drawn; and the means for operating said rings, said twisting and wipe rolls and said mechanisms, substantially as hereinbefore set forth.

10. In the herein-described machine for spinning or making yarn from fibrous materials, the combination of the doffer-rings for receiving the material in many or numerous narrow and separate sections or subdivisions; the individual doffing-combs for accompanying said rings and vibrating up and down across the surfaces thereof respectively; the twisting-rolls for coöperating with said rings and combs respectively to collect from said rings and roll up and compress said sections or subdivisions of material severally into fibrous rolls and to revolve said fibrous rolls; the winding mechanism for drawing said rotating fibrous rolls severally, as they form, lengthwise of themselves into strands of yarn and winding said yarn; the condensing mechanism for compressing or condensing said strands of material severally while being so drawn; and the means for operating said rings, combs, twisting-rolls, and mechanisms, substantially as hereinbefore set forth.

11. In a machine for spinning or making yarn from fibrous materials, the combination of a doffer for receiving the material; a twisting and wipe roll for coöperating with such doffer to collect therefrom and roll up and compress the material into a fibrous roll and revolve such fibrous roll; side-drawing mechanism for drawing such rotating fibrous roll, as it forms, lengthwise of itself into yarn; condensing mechanism for compressing or condensing the material while being so drawn; and means for operating said doffer and said twisting and wipe roll, substantially as hereinbefore set forth.

12. In a machine for spinning or making yarn from fibrous materials, the combination of a doffer for receiving the material; a doffing-comb for accompanying said doffer and vibrating up and down across its surface; a twisting-roll for coöperating with such doffer and comb to collect from the doffer and roll up and compress the material into a fibrous roll and revolve said fibrous roll; winding mechanism for drawing said rotating fibrous roll, as it forms, lengthwise of itself into yarn and winding said yarn; condensing mechanism for compressing or condensing said material while being so drawn; and means for operating said doffer, comb and twisting and wipe roll, substantially as hereinbefore set forth.

13. In machinery for making yarn from fibrous material, the combination of means for carding the material, with cylinders clothed with numerous narrow rings of card-clothing, on each at predetermined intervals apart, to subdivide the carded material into numerous narrow and separate sections, and means for simultaneously drawing away from said rings respectively, sidewise thereof, the said sections of fibrous material, and spinning the same into yarn, substantially as hereinbefore described.

In testimony whereof I have hereunto set my hand this 17th day of November, 1897.

WILLIAM H. DRURY.

Witnesses:
GEO. H. ABBOTT,
WILBERFORCE B. HAMMOND.